(12) United States Patent
Arnaud

(10) Patent No.: US 7,728,761 B2
(45) Date of Patent: Jun. 1, 2010

(54) ACTIVE DEVICE FOR THE RECEPTION AND THE EMISSION OF ELECTROMAGNETIC WAVES

(75) Inventor: Alain Henri Jean Arnaud, Barelona (ES)

(73) Assignee: Altamira Information, S.L., Barcelona (ES)

( * ) Notice: Subject to any disclaimer, the term of this patent is extended or adjusted under 35 U.S.C. 154(b) by 0 days.

(21) Appl. No.: 12/087,366

(22) PCT Filed: Dec. 22, 2006

(86) PCT No.: PCT/EP2006/070174

§ 371 (c)(1),
(2), (4) Date: Dec. 19, 2008

(87) PCT Pub. No.: WO2007/077169

PCT Pub. Date: Jul. 12, 2007

(65) Prior Publication Data

US 2009/0121914 A1    May 14, 2009

Related U.S. Application Data

(60) Provisional application No. 60/757,887, filed on Jan. 11, 2006.

(30) Foreign Application Priority Data

Jan. 3, 2006    (ES)    ................................. 200600033

(51) Int. Cl.
    *G01S 13/76*    (2006.01)
(52) U.S. Cl. ........................................................ 342/42
(58) Field of Classification Search ............... 342/42, 342/51, 25 R
See application file for complete search history.

(56) References Cited

U.S. PATENT DOCUMENTS

| 5,486,830 A | * | 1/1996 | Axline et al. ................. 342/43 |
| 5,821,895 A | | 10/1998 | Hounam et al. |
| 6,100,840 A | | 8/2000 | Zidek et al. |
| 2004/0233096 A1 | | 11/2004 | Russo et al. |
| 2009/0121914 A1 | * | 5/2009 | Arnaud ........................ 342/42 |

FOREIGN PATENT DOCUMENTS

WO    WO 2007077169 A1 *    7/2007

OTHER PUBLICATIONS

Zink et al.; "Calibration and Early Results of the ASAR on ENVISAT", IEEE, Geoscience and Remote Sensing Symposium, pp. 596-598, (2002).

* cited by examiner

*Primary Examiner*—Dan Pihulic
(74) *Attorney, Agent, or Firm*—Finnegan, Henderson, Farabow, Garrett & Dunner, L.L.P.

(57) ABSTRACT

An active device includes a receiving antenna (6) that receives an electromagnetic (2) signal coming from a localisation system (3) and at least one emitting antenna (8) that 5 resends said signal (2) to said localisation system (3), and is characterised in that said device (4) includes a plurality of said emitting antennae (8) connected to at least one receiving antenna (6) in such a way that said emitting antennae (8) receive the electromagnetic (2) signal coming 10 from said at least one receiving antenna (6), with each of said emitting antennae (8) being the ones that resend the signal (2) to said localisation system (3). This offers the possibility of creating artificial measuring points that are retained over time easily, cheaply and simply, 15 whether in wooded zones, snow-covered zones or at sea.

10 Claims, 5 Drawing Sheets

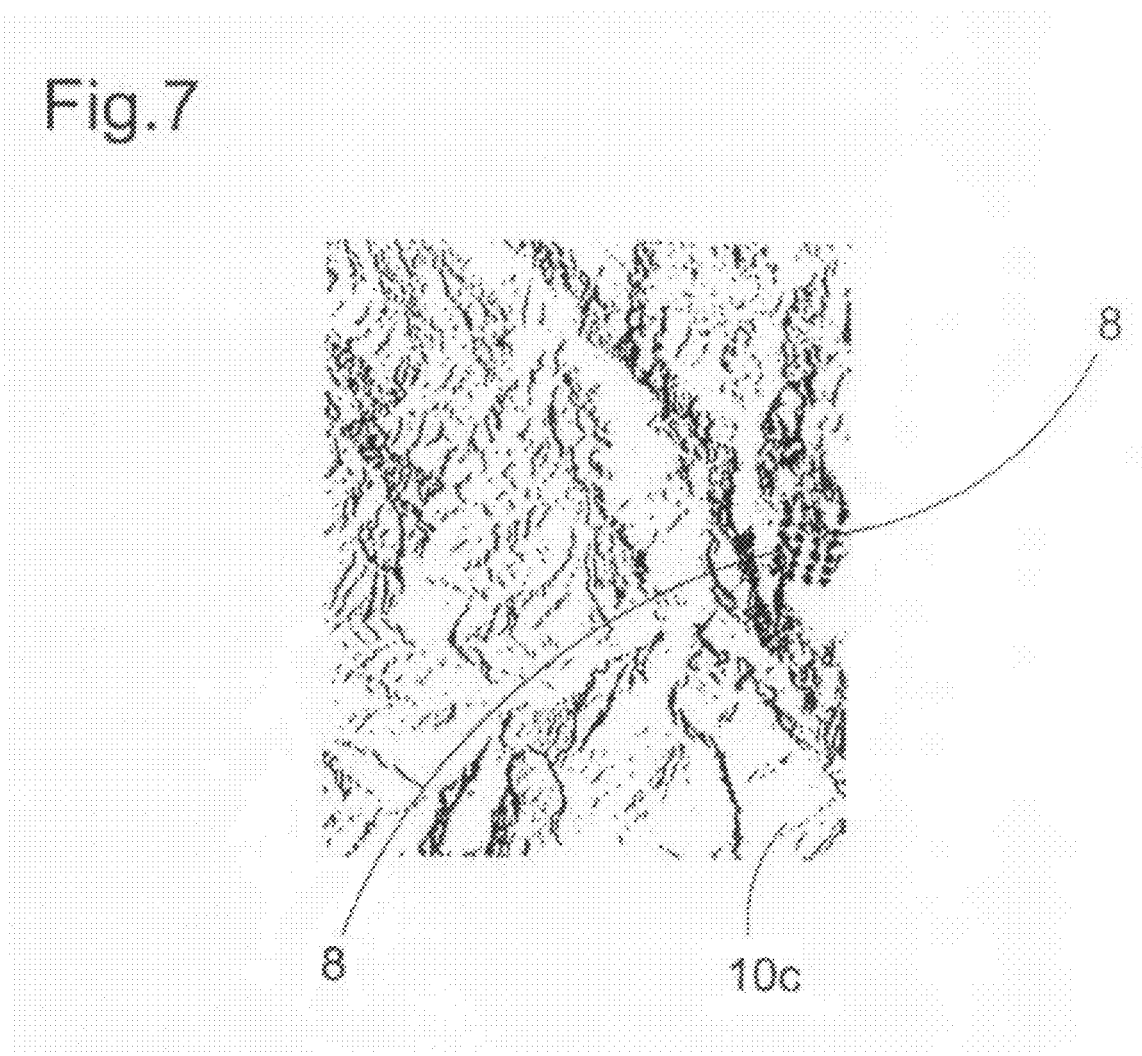

ACTIVE DEVICE FOR THE RECEPTION AND THE EMISSION OF ELECTROMAGNETIC WAVES

CROSS REFERENCE TO RELATED APPLICATIONS

This application is a national phase application based on international application number PCT/EP2006/070174, filed Dec. 22, 2006, and claims priority of Spanish Patent Application No. P-200600033, filed Jan. 3, 2006, and the benefit of U.S. Provisional Application No. 60/757,887, filed Jan. 11, 2006, the content of all of which is incorporated herein by reference.

FIELD OF THE INVENTION

The present invention relates to an active device for the reception and the emission of electromagnetic waves, especially for carrying out measurements by means of localisation systems, such as the synthetic aperture radar system.

BACKGROUND OF THE INVENTION

Localisation systems are known such as radar that permit objects to be detected, measured and localised by sending electromagnetic waves.

The radar system sends bursts of electromagnetic waves by means of an antenna and is capable of picking up, either by the same antenna or by an additional antenna, the echo or reflection of the waves caused by the presence of the objects.

As is now known, with a synthetic aperture radar it is possible to generate images of terrestrial surfaces in which, basically, the position of one point is a function of the distance between the platform on which the radar is mounted (for example, a satellite) and said point situated on the ground.

The information provided by a radar is useful for measuring movements of the soil or of buildings by means of techniques called radar interferometry correlation. In order to be able to study with precision the movement of a particular point of an image, it is essential that said measurement point be a reflective point that remains permanent over time, that is, one that does not change with time. Thus if, for example, said point is the surface of the roof of a house, that house cannot be altered (demolished, or changed by adding a further story).

Often, however, it is necessary to study earth movements in zones that do not remain stable over time, such as wooded zones, snow-covered zones or sea zones (petroleum extraction zones), in which it is difficult to find features or structures useful to serve as stable reflecting points. In order to be able to have measuring points in such zones it is necessary to have artificial reflecting points such as the so-called passive reflectors (trihedral, dihedral or specular "corner reflectors") and the so-called active reflectors ("active transponder").

Corner reflectors are passive electromagnetic wave receiving and re-emitting devices that comprise metallic trihedrals that act as mirrors to the waves coming from the radar. Such corner reflectors present the disadvantage that they must be situated in zones where they cannot be covered by vegetation or snow, since they need a sight-line on the radar both for receiving the signal and for reflecting it.

The classic active devices for receiving and re-emitting electromagnetic waves have a receiving antenna that receives the signal coming from the radar and, usually, also an additional emitting antenna that resends said signal. Said systems also present the disadvantage that they need to have a sight-line on the radar in order to receive the signal and allow it to be re-emitted (it should be taken into account that the signal that comes from a radar situated on a satellite cannot be amplified to improve its reception, since said satellite is at an altitude of 800 km).

In any of the devices cited, reception and re-emission of the electromagnetic signal from a radar is impossible in zones close to the poles or subject to high snowfall, since in those zones the receiving and emitting points are always covered in snow. And with the devices cited, in order to ensure reception and re-emission of the signal in wooded zones it is essential to fell trees. Thus, it is not economically or environmentally viable in such zones to calculate earth movements by processing radar images (interferometry).

DESCRIPTION OF THE INVENTION

The objective of the present invention is to resolve the disadvantages mentioned by developing an active device for the reception and the emission of electromagnetic waves, especially for carrying out measurements by means of localisation systems, that enables the creation of artificial measuring points that are retained over time, in an easy, simple, low-cost and environmentally viable way.

In accordance with this objective, the device of the present invention comprises a receiving antenna that receives the electromagnetic signal coming from said localisation system and at least one emitting antenna that resends said signal to said localisation system, and is characterised in that said device includes a plurality of said emitting antennae connected to at least one receiving antenna, in such a way that said emitting antennae receive the electromagnetic signal coming from said at least one receiving antenna, being each one of said emitting antennae the ones which resend the signal to said localisation system.

In the present invention, localisation system will be preferably taken to mean a system capable of sending out and of picking up electromagnetic waves that permits points to be detected, distances measured and/or objects located, such as a synthetic aperture radar, an altimetric radar or a fixed radar.

Preferably, said electromagnetic waves will be high-frequency waves (microwaves).

Surprisingly, the device of the present invention presents the advantages that are described below in relation with the devices of the state of the art.

On the one hand, it offers the possibility of creating artificial measuring points that are retained over time easily, at low cost and simply, whether it be in wooded zones, snow-covered zones or at sea.

This is due to the fact that, in the device of the invention, the emitting antennae are physically separated from the receiving antenna, that is, the signal from the radar is received on the land surface only by the receiving antenna, while that same signal is sent back by the plurality of emitting antennae connected to the receiving antenna. Thanks to these characteristics, the emitting antennae do not receive the signal but only send it, for which reason they do not need to be placed in zones visible to the radar. Moreover, if said emitting antennae have sufficient power, they can even be placed beneath the snow or under trees.

Unlike the devices of the state of the art, in the device of the present invention the points on which the emitting antennae are situated are the only ones that act as reflecting points or measuring points of the localisation system. The site at which the receiving antenna is located does not therefore constitute a measurement point of the system. Thanks to this, the receiving antenna can be situated in a zone that ensures high visibility of the radar (the positioning of this antenna does not affect the quality of the measurements) and said antenna can at the same time be protected from inclement weather, for example by means of a small roof.

Another important advantage of the device of the present invention lies in the fact that it offers greater measurement precision.

Indeed, the device can have a single receiving antenna for receiving the signal from radar. It is therefore a centralised reception device that carries out multiple emission of the signal by means of the plurality of emitting antennae connected to the receiving antenna. Said centralised reception offers the advantage that it permits sources of error related with reception to be eliminated.

As is known, in localisation systems that use radar, the position of a point is in function of the distance between the radar and said point. Taking into account that the speed of propagation of an electromagnetic wave in space is equal to the speed of light, measurement of the distance between the radar and said point is based on calculating the outward and return time of the electromagnetic wave from the radar to the aforesaid reflector point. Atmospheric disturbances such as changes of temperature can mean that the time elapsed between reception and re-emission of the signal is not uniform for all the measuring points.

However, in the device of the present invention, unlike the devices of state of the art, as there is only one receiving antenna connected to the emitting antennae, the variability in the measurements due to the different reception times of the signal caused, for example, by atmospheric disturbances, is eliminated, thereby providing greater measurement precision.

According to a preferred embodiment of the device of the present invention, the localisation system comprises a radar mounted on a platform, preferably a satellite, said radar being of the type capable of generating images and recording on said images the signals emitted by each one of the emitting antennae of the device. According to the same preferred embodiment, the emitting antennae are mounted on the surface of a structure or element that moves, with each one of said antennae constituting a data measurement point.

The preferred embodiment described enables use of the device of the present invention to measure deformations of land or buildings by means of techniques called radar interferometry correlation (processing of radar images).

With the device of the invention, the calculation of earth movements by interferometry radar techniques is possible and economically and environmentally viable in any type of zone, since, as we have remarked, it permits the creation of artificial measuring points that are retained over time, whether in wooded zones or snow-covered zones.

Preferably, the device of the present invention includes means of amplification of the power of the signal coming from said at least one receiving antenna. Thanks to this it is possible to ensure that the signal resent by the emitting antennae returns to the radar. In particular, said means of amplification are very useful when the emitting antennae are covered by abundant snow or dense vegetation.

Advantageously, the connection between said at least one receiving antenna and said emitting antennae is wireless.

Also preferably, the device of the invention includes means of control of the time elapsed between reception of the signal by said at least one receiving antenna and emission of the signal by each one of the emitting antennae of said device. Thanks to this, it is possible to delay and/or advance the emission of the signal, in such a way that the echoes from the emitters installed at a fixed geographical position can be recorded virtually on points of a radar image that do not correspond with the geographical location of the emitters zone.

Advantageously, the device of the invention includes a plurality of receiving antennae connected to the plurality of emitting antennae.

The existence of various receiving antennae connected to a single group of emitting antennae means that, by delaying and advancing the emission of the signal, the echoes or waves transmitted by said emitting antennae can be recorded virtually in images coming from adjacent trajectories of the radar. The frequency of delivery of information is thus greater than that obtained with the devices of the state of the art for a given set of measuring points (emitting antennae), since a single pass of the satellite through the zone of the emitters provides a larger number of measurements.

Also advantageously, the control means of the device include means to defer the sending of the signal coming from the at least one receiving antenna to the emitting antennae connected to said receiving antenna.

In this way, the device of the invention can guarantee the confidentiality of certain measuring points, because by delaying the sending of the signal to the emitting antennae, the echoes or waves transmitted from said emitting antennae can be recorded virtually on an image whose points do not correspond with the exact geographical localisation of the emitting antennae or measuring points.

Also advantageously, the control means of the device include means to individually defer emission of the signal from at least one of said emitting antennae connected to said receiving antenna.

It is thus possible to achieve an increase in the apparent resolution of the radar. For example, in zones where the measuring points (emitting antennae) are situated every 2 metres (a distance shorter than the typical 10-metre resolution offered by a radar of the ENVISAT type), the reading of the echoes or waves reflected by the emitting antennae is recorded jointly, which prevents their individual analysis. In such zones it is very useful to defer emission of the signal from the emitters in order to be able to simulate a grid of measuring points separated by at least 10 metres, which is the resolution offered by the radar.

Optionally, the device of the present invention includes means for coding the signal coming from said at least one receiving antenna, said means acting before emission of the signal by means of said emitting antennae. The aforesaid coding allows the sending of coded artificial echoes over the emitters that can only be read if decoded by a specific program.

Alternatively, the device of the present invention can include means for coding information from a source external to said localisation system, means for transmitting said coded information to said plurality of emitting antennae, and means for controlling the mode of emission of the signal from the emitting antennae in function of said coded information.

Thanks to this, during emission of the signal, information can also be sent about the meteorological conditions, or, for example, information coming from geographical information systems, which can be left recorded in coded form on the radar image.

BRIEF DESCRIPTION OF THE DRAWINGS

For a better understanding of the matters outlined herein some drawings are attached which, schematically and solely by way of non-restrictive example, show practical cases of embodiment.

In said drawings,

FIGS. 5, 6 and 7 show three radar images of adjacent trajectories on which the measuring points corresponding to the emitting antennae of the device are shown recorded.

DESCRIPTION OF PREFERRED EMBODIMENTS

Figure 1A:
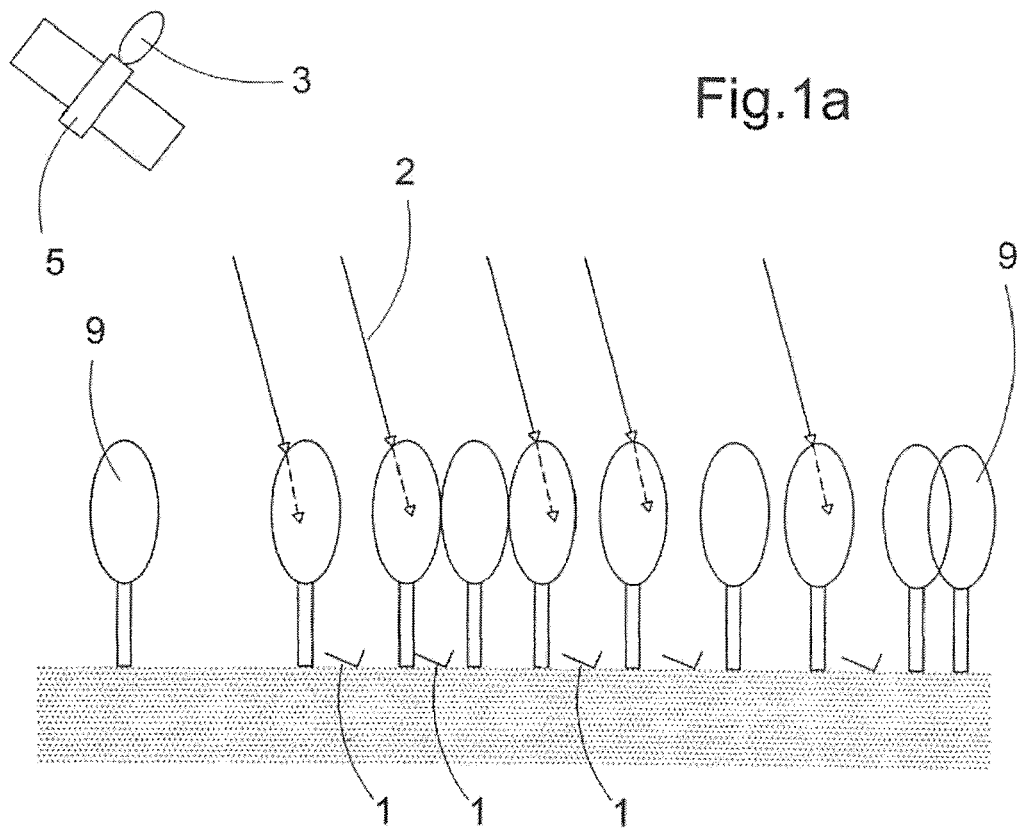
FIGS. 1a and 1b show an installation of devices of the state of the art in a wooded zone.

FIG. 1a shows an installation of devices 1 of the state of the art that has been implemented in a wooded zone. Each one of said devices 1 includes a receiving antenna and an emitting antenna of electromagnetic waves 2.

Figure 1B:
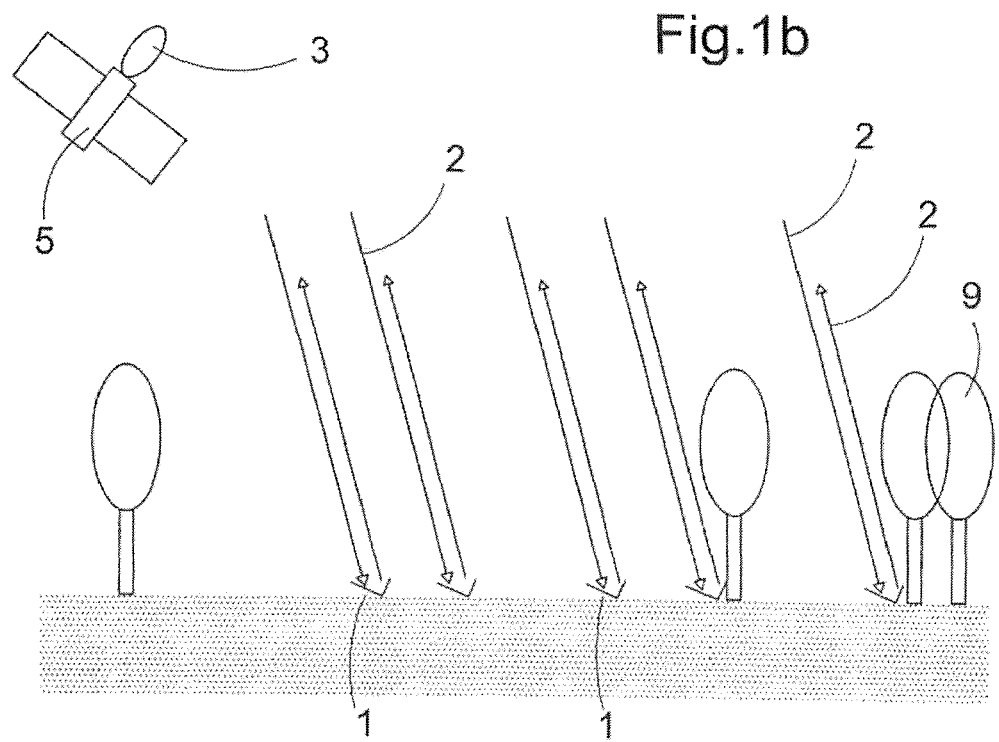

The devices 1 shown present the disadvantage that the receiving antenna must have a sight-line on the satellite that includes the radar 3 in order to be able to pick up and resend the waves 2. Thus, as FIG. 1b shows, in order to ensure reception and emission of the signal 2 in a wooded zone it is essential to fell the trees that obstruct the line of sight between the radar 3 and the receiving antenna.

In addition to being expensive, the felling of trees is also environmentally inappropriate, so that in practice the installation of devices 1 in wooded zones is not very viable. The same is true when the installation must be carried out in zones that are normally snow-covered, since this likewise blocks the sight-line on the radar 3.

Figure 2:
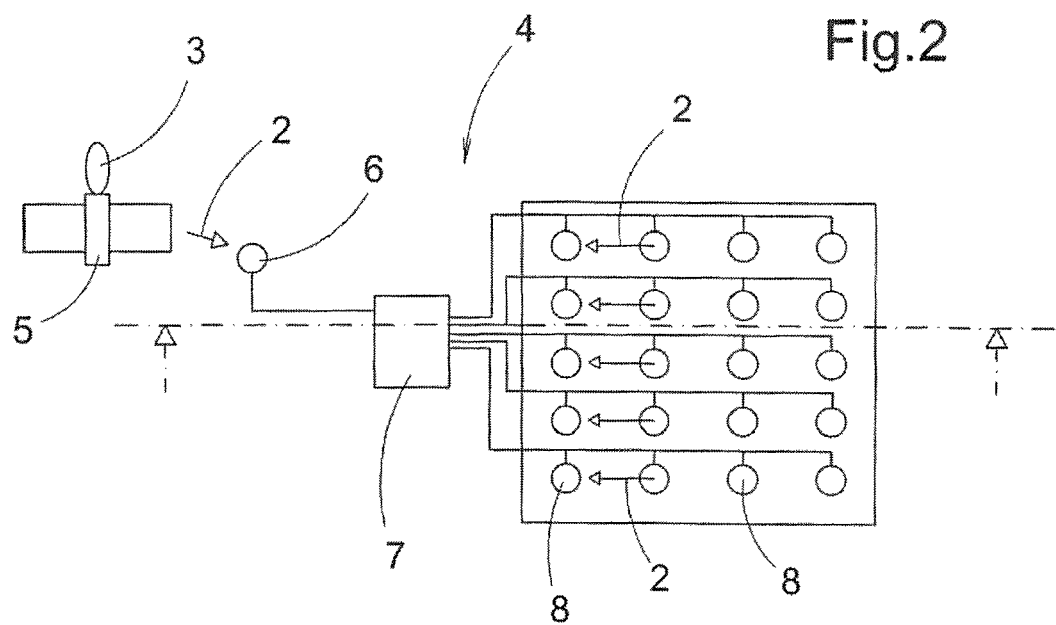
FIG. 2 shows a plan view of a preferred embodiment of the device of the present invention.
Figure 3:
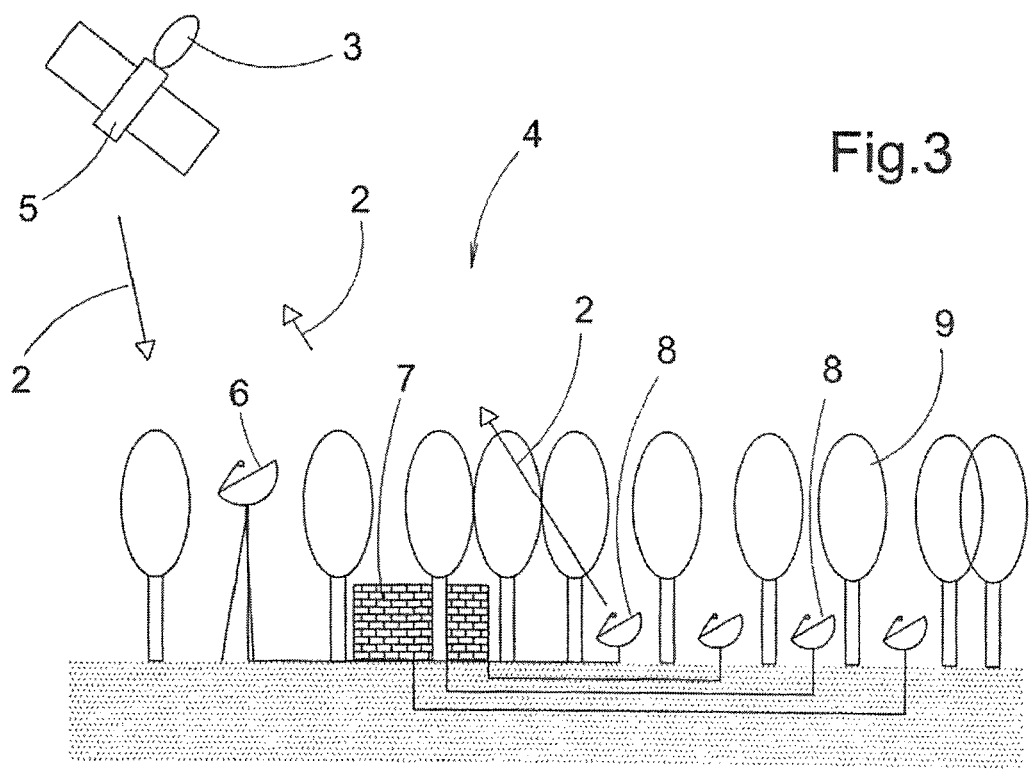
FIG. 3 shows a side view of the device of the FIG. 1.

FIG. 2 shows a plan view of a preferred embodiment of the device 4 of the present invention installed in a heavy-petroleum extraction zone. In the embodiment described, the device 4 comprises a synthetic aperture radar 3 capable of generating images (SAR system). Said radar 3 is mounted on a single satellite 5 or a cluster of satellites 5.

The technical characteristics of the SAR radars that can be used in the present invention are as follows:

Wavelength K,X,C,L, in the embodiment, C.

Distance Off nadir: 1-1,000 km, in the embodiment 180-670 km.

Angle of incidence 5-80, in the embodiment 15-45.

Resolution from 0.1 to 20 metres, in the embodiment 10 metres.

Polarisation HH, VV, HV, VH and all combinations of the foregoing, in the embodiment, HH or VV.

Cycle: from 1 to 50 days, in the embodiment 35 days.

The device 4 includes a receiving antenna 6, a control centre 7 connected to an electrical power source and a plurality of emitting antennae 8 set on the ground between the trees 9 and connected to said receiving antenna 6 through said control centre 7. Each of said antennae 8 corresponds to a data measurement point.

The technical characteristics of the receiving and emitting antennae that can be used in the present invention are as follows:

Receiving Antenna:

Band K,X,C,L, in the embodiment C.

Multi-incidence, in the embodiment 15-45.

Multi-polarisation, in the embodiment H or V.

Emitting Antenna:

Wavelength K,X,C,L, preferably X,C, in the embodiment C.

Omnidirectional

Power up to 1 kW or more, in the embodiment 10 watts.

Polarisation H,V, in the embodiment H or V.

Size: between 20 cm and 2 m, in the embodiment 50 cm.

In the embodiment described, the device is used to measure the deformations to which the land is subject in petroleum extraction. A technique called radar interferometry correlation is used for this purpose, in which each one of said emitting antennae 8 corresponds to a point from which its relative deformation will be measured. In short, the idea is to monitor a petroleum extraction zone situated in a wooded zone of boreal type covering an area of 1 km$^2$ and for which it has been calculated that 20 measuring points are necessary.

There follows a description of the mode of operation of the device 4.

The device 4 receives the signal 2 through the receiving antenna 6, and the control centre 7 then gives the order to the emitters 8 for them to emit the signal 2 towards the satellite 5. Emission of the signal 2 is carried out consecutively following the direction of advance of the satellite 5. The passing of the satellite 5 over the device 4 supplies an image on which are recorded the echoes or waves 2 reflected by the emitting antennae 8. A study of the phases of said reflected echoes or waves 2 will permit measurement of the relative movement on the ground of the emitting antennae 8 (measuring points).

In the embodiment described, the control centre 7 of the device 4 includes power amplification and coding means of the signal 2 coming from the receiving antenna 6. This power amplification ensures correct re-emission of the signal 2 in zones where the vegetation is very thick, while the coding enables the sending of coded radar echoes or waves 2 that are only visible on radar image if they are decoded.

Coding of the signal 2 prior to its re-emission is useful for ensuring the confidentiality of the measurements taken. However, the device 4 also permits the confidentiality of the measurements taken to be ensured simply by deferring the sending of the signal 2 coming from the receiving antenna 6. Indeed, the control centre 7 may optionally send an order to the set of emitters 8 so that the signal 2 is sent out with a certain delay. In this way, the reflected radar echoes or waves 2 are recorded virtually on a radar image whose points do not correspond with the exact geographical localisation of the enclave in which the emitters 8 are situated.

Figure 4:
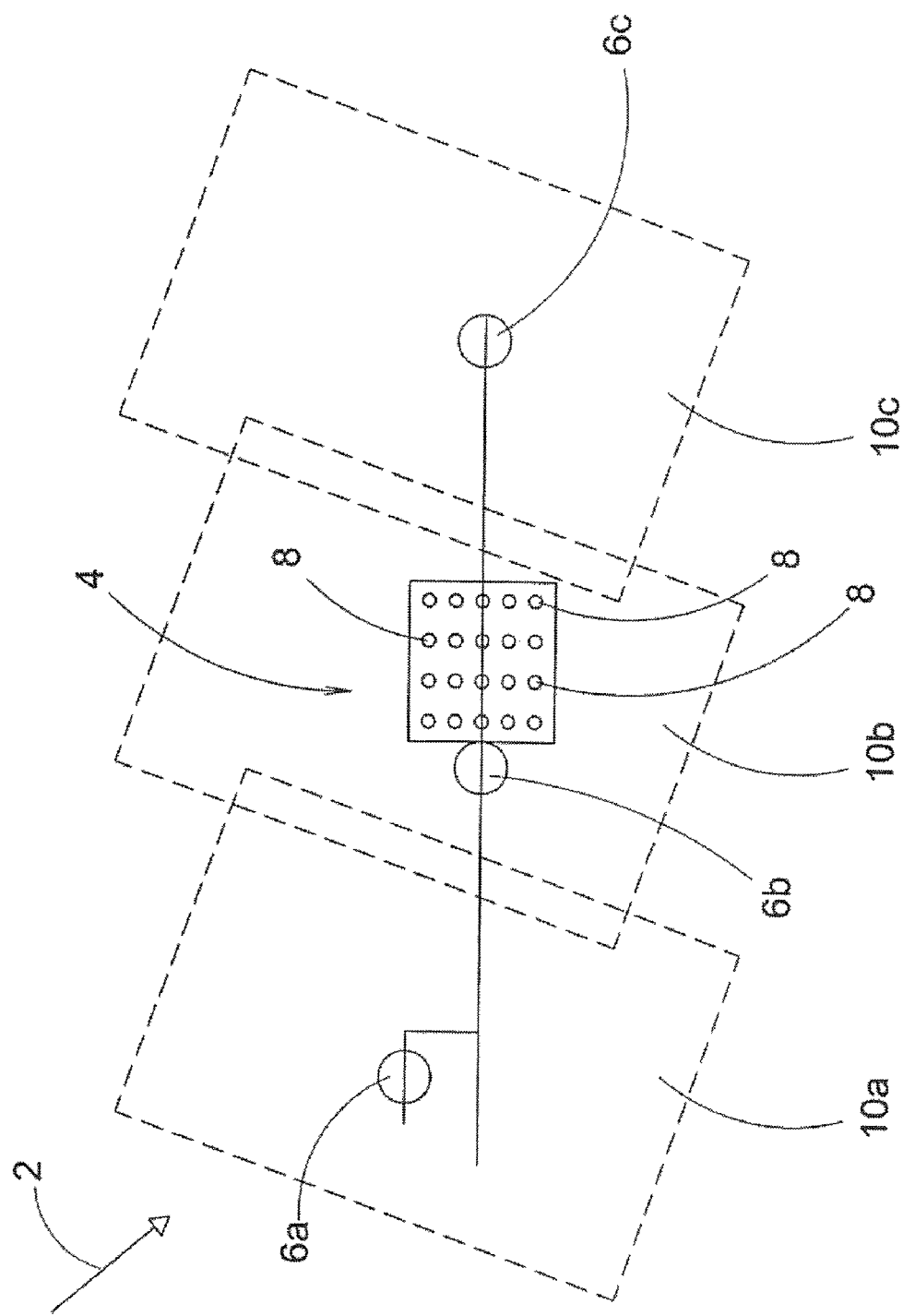
FIG. 4 shows a schematic view of an embodiment of the device that includes three reception antennae connected to a sole set of emitting antennae.

FIG. 4 shows a schematic view of an embodiment of the device 4 that includes three receiving antennae 6 connected to a sole plurality of emitting antennae 8.

As noted in the description of the invention, the addition of supplementary receiving antennae 6 has the advantage of permitting the frequency of delivery of information to be increased, since the radar echoes or waves 2 reflected by the same group of emitters 8 can be recorded on various images with trajectories adjacent to the radar 3. This means that in practice the number of measurements made by the same emitters 8 situated in a specific geographical zone can be increased, without having to wait for the satellite 5 to make the complete trajectory of its orbit to pass again over the zone of the emitters 8. For example, in the case of a radar satellite with a nominal orbit of 35 days (ENVISAT), the use of supplementary receiving antennae can achieve an image every 3 days instead of every 35 days.

There follows an outline of the operation of FIG. 4.

In the embodiment of FIG. 4, the signal 2 from the radar 3 arrives from the left, so that the first receiving antenna that picks up the signal 2 is the reference antenna 6a. At the time when the antenna 6a picks up the signal 2, the satellite 5 has not yet crossed the geographical zone in which the emitters 8 are situated. So, if the aim is for the radar echoes from said emitters 8 to be recorded (virtually, of course) on the radar image 10a, which corresponds to the geographical location of the antenna 6a, it is essential that the control centre 7 orders the emitters 8 to emit a certain time in advance.

The second receiving antenna that picks up the signal 2 is the antenna referenced 6*b*. In this case, the radar echoes from the emitters 8 will be recorded on the radar image 10*b*, which is the image of the geographical zone in which said emitters 8 really are located.

The last antenna that will pick up the signal 2 is the antenna referenced 6*c*. By the time the antenna 6*c* picks up the signal 2, the satellite 5 has already crossed the geographical zone where the emitters 8 are situated. So, if the wish is for the radar echoes from said emitters 8 to be recorded (virtually) on the radar image 10*c*, which corresponds to the geographical location of the antenna 6*c*, it is essential that the control centre 7 orders the emission of the signal 2 with a certain delay.

Figure 5:
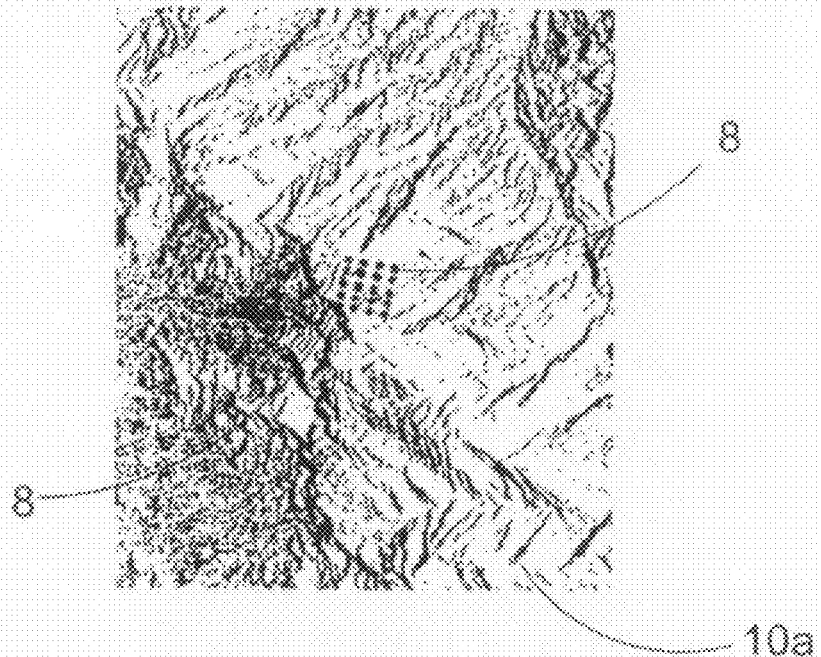
Figure 6:
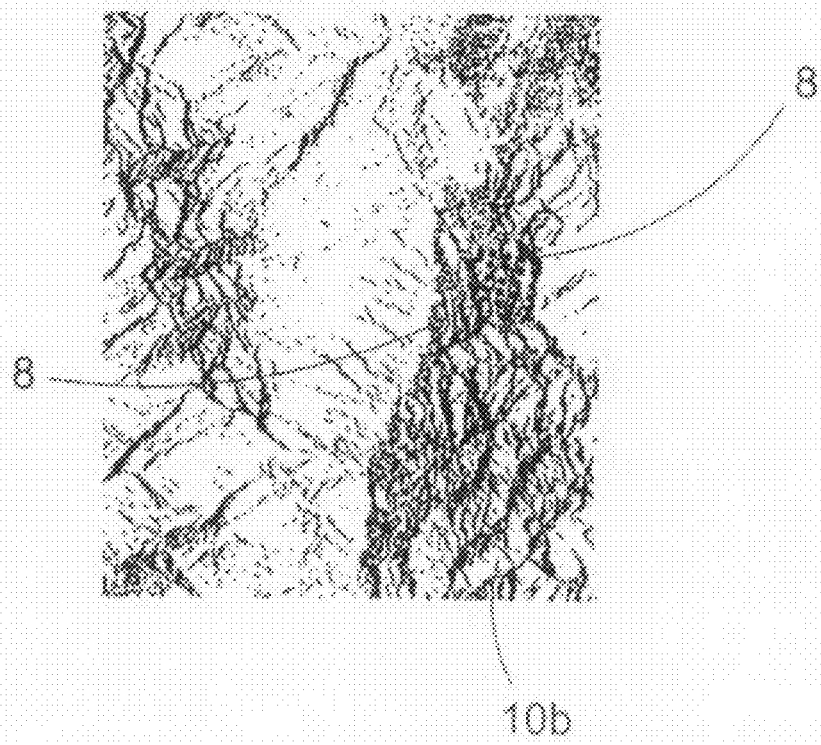

FIGS. 5, 6 and 7 show the three radar images 10*a*, 10*b* and 10*c*, corresponding to the three adjacent trajectories of the satellite 5. As noted above, each of said images 10*a*, 10*b* and 10*c* show the recorded radar echoes or waves 2 reflected by the emitters 8 of the device 4. In such a way, a higher frequency of measurements is obtained with a single pass of the satellite 5 over the emitters 8 zone.

The control centre 7 of the device 4 can also be used to increase the apparent resolution of the satellite 5. Thus, in zones where it is of interest to have a high density of measuring points it results that the radar 3 of the satellite 5 takes the readings mixed instead of individually. In these zones it will be useful to defer the emission of each one of the emitters 8 individually in order to be able to simulate a grid of measuring points at least 10 metres apart, which is the resolution the radar 3 habitually offers. In any case, the individual emission delay for each one of the emitters 8 will always be calculated in such a way as to permit easy reading of the results on the radar image in function of the resolution of the satellite 5. The centralised reception system of the present invention has the advantage of enormously facilitating the aforesaid operation of individually delaying the emission, since a single control centre 7 is used to carry it out.

Another advantage of the device 4 of the present invention is the fact that the control centre 7 can also code information coming from outside the radar 3, such as information from geographical information systems, or meteorological information. In these cases the emission mode of the signal 2 from the emitters 8 is modified in function of the coded information, so that a single radar image includes both information from the device 4 itself and external information.

The invention claimed is:

1. An active device for the reception and the emission of electromagnetic waves for measuring movements of particular points of terrestrial surface comprising:
    a localization system,
    at least one receiving antenna, which receives an electromagnetic signal coming from said localization system, and
    a plurality of emitting antennae that resend said electromagnetic signal to said localization system,
    wherein said plurality of emitting antennae are connected to said at least one receiving antenna such that said plurality of emitting antennae receive said electromagnetic signal from said at least one receiving antenna, and
    wherein each of said plurality of emitting antennae are physically separated from said at least one receiving antenna so that each of said plurality of emitting antennae corresponds to a data measuring point for said localization system.

2. The active device according to claim 1, further comprising a means of power amplification for said electromagnetic signal from said at least one receiving antenna.

3. The active device according to claim 1 or 2, further comprising a first controller for controlling the time elapsed between receipt of said electromagnetic signal by said at least one receiving antenna and emission of said electromagnetic signal by each of said plurality of emitting antennae.

4. The active device according to claim 3, wherein said plurality of emitting antennae are connected to a plurality of receiving antennae.

5. The active device according to claim 3, wherein said first controller defers the sending of said electromagnetic signal from said at least one receiving antenna to said plurality of emitting antennae connected to said at least one receiving antenna.

6. The active device according to claim 3, wherein said first controller individually defers the emission of said electromagnetic signal from at least one of said plurality of emitting antennae connected to said at least one receiving antenna.

7. The active device according to claim 1, further comprising a first coder for coding said electromagnetic signal from said at least one receiving antenna prior to said plurality of emitting antennae resending said electromagnetic signal to said localization system.

8. The active device according to claim 1, further comprising a second coder for coding information from outside said localization system, a transmitter for transmitting said coded information to said plurality of emitting antennae, and a second controller for using the transmitted coded information to control the mode of emission of said electromagnetic signal from said plurality of emitting antennae.

9. The active device according to claim 1, wherein said localization system comprises a radar mounted on a platform and wherein said radar is capable of generating images that record said electromagnetic signal emitted by each of said plurality of emitting antennae.

10. The active device according to claim 9, wherein said plurality of emitting antennae are mounted on a movable surface.

* * * * *